United States Patent
Arora et al.

(10) Patent No.: US 10,574,974 B2
(45) Date of Patent: Feb. 25, 2020

(54) 3-D MODEL GENERATION USING MULTIPLE CAMERAS

(71) Applicant: A9.com, Inc., Palo Alto, CA (US)

(72) Inventors: Himanshu Arora, San Jose, CA (US); Arnab Sanat Kumar Dhua, Mountain View, CA (US); Sunil Ramesh, San Jose, CA (US); Chen Fang, West Lebanon, NH (US)

(73) Assignee: A9.com, Inc., Palo Alto, CA (US)

( * ) Notice: Subject to any disclaimer, the term of this patent is extended or adjusted under 35 U.S.C. 154(b) by 243 days.

(21) Appl. No.: 14/318,355

(22) Filed: Jun. 27, 2014

(65) Prior Publication Data

US 2015/0381968 A1    Dec. 31, 2015

(51) Int. Cl.
*H04N 13/282* (2018.01)
*H04N 13/275* (2018.01)
*G06T 17/00* (2006.01)

(52) U.S. Cl.
CPC ........... *H04N 13/282* (2018.05); *G06T 17/00* (2013.01); *H04N 13/275* (2018.05)

(58) Field of Classification Search
CPC ........... G06T 17/00; G06T 2207/10028; G06T 7/0065; H04N 13/0275; H04N 13/0282
USPC .......................................................... 348/47
See application file for complete search history.

(56) References Cited

U.S. PATENT DOCUMENTS

| | | | |
|---|---|---|---|
| 8,416,236 B1* | 4/2013 | Hickman | G06T 19/20 345/419 |
| 8,818,609 B1* | 8/2014 | Boyko | B60W 30/00 342/70 |
| 8,897,543 B1* | 11/2014 | Lin | G06K 9/46 382/154 |
| 2004/0247174 A1* | 12/2004 | Lyons | G06F 3/04845 382/154 |
| 2006/0193179 A1 | 8/2006 | England | |
| 2008/0310757 A1* | 12/2008 | Wolberg | G06K 9/00208 382/285 |

(Continued)

OTHER PUBLICATIONS

Vrubel et al., "A 3D Reconstruction Pipeline for Digital Preservation", IMAGO Resarch Group, 2009 IEEE.*

(Continued)

*Primary Examiner* — James T Boylan
(74) *Attorney, Agent, or Firm* — Hogan Lovells US LLP

(57) ABSTRACT

Various embodiments provide for the generation of 3D models of objects. For example, depth data and color image data can be captured from viewpoints around an object using a sensor. A camera having a higher resolution can simultaneously capture image data of the object. Features between images captured by the image sensor and the camera can be extracted and compared to determine a mapping between the camera and the image. Once the mapping between the camera and the image sensor is determined, a second mapping between adjacent viewpoints can be determined for each image around the object. In this example, each viewpoint overlaps with an adjacent viewpoint and features extracted from two overlapping viewpoints are matched to determine their relative alignment. Accordingly, a 3D point cloud can be generated and the images captured by the camera can be projected on the surface of the 3D point cloud to generate the 3D model.

20 Claims, 13 Drawing Sheets

(56) References Cited

U.S. PATENT DOCUMENTS

| | | | | |
|---|---|---|---|---|
| 2011/0254841 | A1* | 10/2011 | Lim | G06T 17/20 345/421 |
| 2014/0192050 | A1* | 7/2014 | Qiu | G06K 9/00214 345/420 |
| 2015/0254857 | A1* | 9/2015 | Huang | G06F 19/3406 382/154 |
| 2015/0381965 | A1* | 12/2015 | Atanassov | H04N 5/23245 348/47 |
| 2018/0255290 | A1* | 9/2018 | Holzer | H04N 13/221 |
| 2019/0220675 | A1* | 7/2019 | Guo | G06K 9/00791 |
| 2019/0221121 | A1* | 7/2019 | Guo | B60W 40/04 |

OTHER PUBLICATIONS

Segundo et al., "Automating 3D Reconstruction Pipeline by Surf-Based Alignment", IMAGO Research Group, 2012 IEEE.*

Shreve et al., "High-resolution 3D surface straing magnitude using 2D camera and low-resolution depth sensor", Department Computer Science and Engineering, University of South Florida, Jan. 15, 2014.*

Ataer-Cansizoglu et al., "Tracking an RGB-D Camera Using Points and Planes", 2013 IEEE.*

Lai et al., "A Large-Scale Hierarchical Multi-View RGB-D Object Dataset", 2011 IEEE International Conference on Robotics and Automation, May 9-13, 2011, Shanghai, China.*

Henry et al., "RGB-D mapping: Using Kinect-style depth cameras for dense 3D modeling of indoor environments" The International Journal of Robotics Research, Mar. 14, 2012.*

Inomata et al., "Registration of 3D Geometric Model and Color Images Using SIFT and Range Intensity Images", Chuo University, 2011.*

Xie et al., "Fine Registration of 3D Point Clouds with Iterative Closest Point Using an RGB-D Camera", Dept. of Electrical Engineering, University of Washing; Industrial Technology Research Institute Taiwan; IDM T.J. Watson Research Center; 2013.*

Adrande et al. "Digital preservation of Brazilian indigenous artworks: Generating high quality textures for 3D models", Journal of Cultural Heritage, Jun. 23, 2011.*

Kurazume et al. "Simultaneous 2D images and 3D geometric model registration for texture mapping utilizing reflectance attribute" ACCV2002: The $5^{th}$ Asian Conference on Computer Vision, Jan. 23-25, 2002.*

Zhang et al. "A Robust technique for matching two uncalibrated images through the recovery of the unknown epipolar geometry" Artificial Intelligence 78, 1995.*

"Henry et al., RGB-D Mapping: Using depth cameras for Dense 3D Modeling of Indoor Environment" (Year: 2010).*

"International Search Report and Written Opinion dated Dec. 14, 2015" received in International Application No. PCT/US2015/037961.

Mauricio Pamplonasegundo et al: "Automating 3D reconstruction pipeline by surf-based alignment", Image Processing (ICIP), 2012 $19^{th}$ IEEE International Conference on, IEEE, Sep. 30, 2012 (Sep. 30, 2012), pp. 1761-1764, XP032333528.

& Vrubel A et al: "A 3D reconstruction pipeline for digital preservation", 2099 IEEE Conference on Computer Vision and Pattern Recognition : CVPR 2009/ Miami [Beach] , Florida, USA Jun. 20-25, 2009, IEEE, Piscataway, NJ, Jun. 20, 2009 (Jun. 20, 2009) pp. 2687-2694, XP031607113.

Shreve Matthew et al: "High-resolution 3D surface strain magnitude using 2D camera and low-resolution depth sensor", Pattern Recognition Letters, Elsevier, Amstermad, NL, vol. 50, Feb. 4, 2014 (Feb. 4, 2014), pp. 34-42, XP029075218.

* cited by examiner

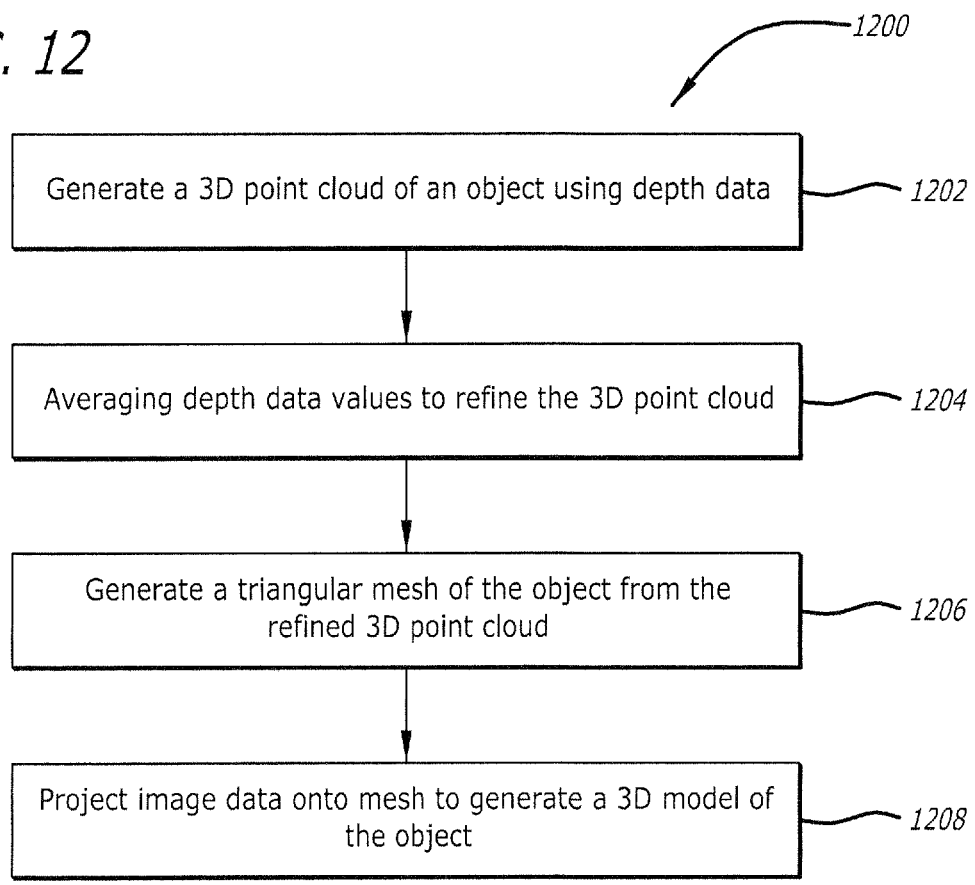

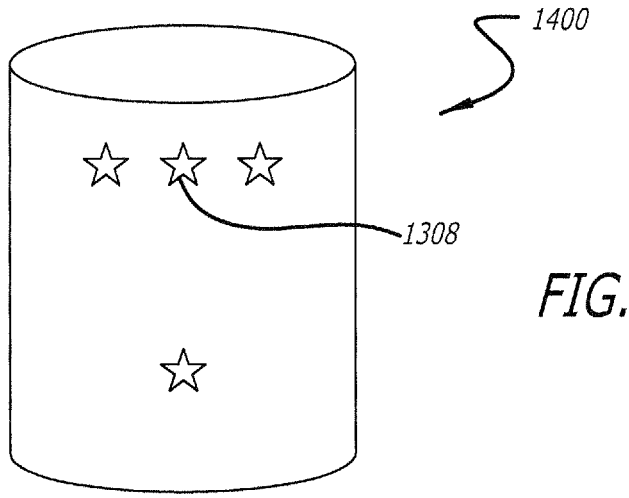
FIG. 14C
Side #2 at 180°
FIG. 15
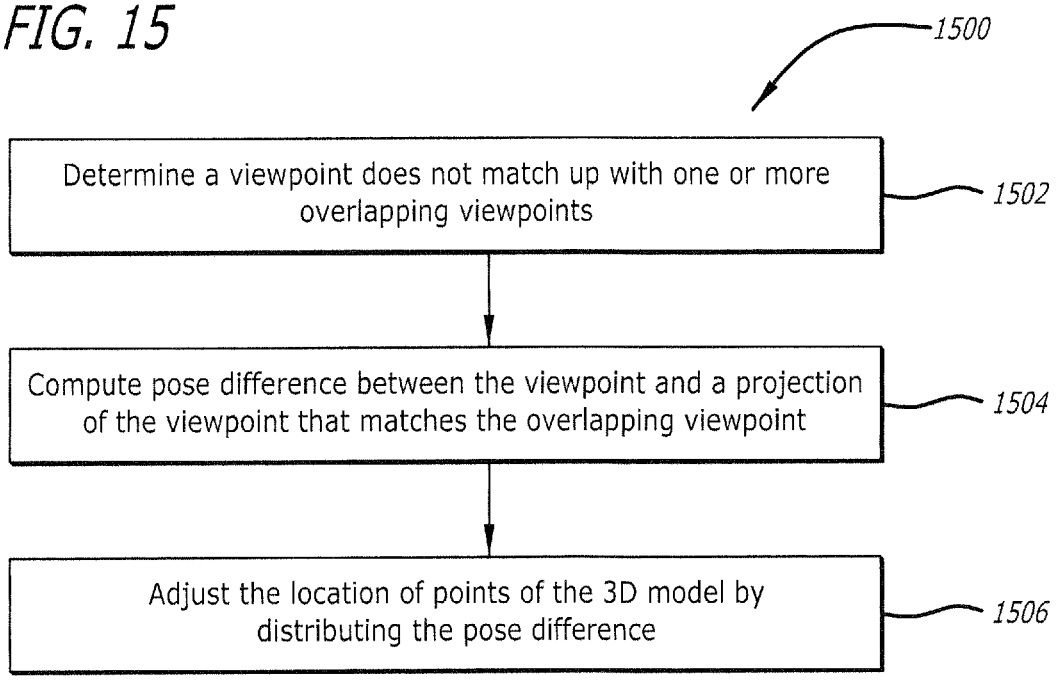

3-D MODEL GENERATION USING MULTIPLE CAMERAS

BACKGROUND

People are increasingly doing their shopping on online through electronic marketplaces. Since these people cannot hold, touch, and try on the items they wish to purchase, they tend to do more research to determine whether product they are purchasing is exactly as the think or hope the product to be. Electronic marketplaces, thus, go through extensive procedures to gather and provide such information in a variety of way. Users are accustomed to viewing high resolution images, videos, or animations of product. Images are an effective way to view a product, but they cannot replace the experience of actually holding the product, moving it around to view from different angles, closely looking at a product from various desired angles, for example.

In order to overcome some of these disadvantages, some electronic marketplaces have attempted to provide three-dimensional (3D) models of product. Various types of data and techniques can be used to create 3D models of an object. Each of these types and techniques has their own pros and cons. Most techniques, however, begin with capturing image data with a set of color camera images of the object taken from arbitrary viewpoints. In computer vision literature, techniques such as Structure from Motion (SFM), Visual Simultaneous Localization and Mapping (Visual SLAM), and Bundle Adjustment (BA) match salient points in these images, or image features to simultaneously estimate relative viewpoints of cameras from which the images are taken, along with a sparse structure of the object. Sparse structure however is not suitable to create a photorealistic rendering needed for visualization and interaction. Other techniques augment cameras with 3D time-of-flight sensors (e.g., LIDAR). While such setups can generate high quality 3D models, they require extensive calibration and long capture times.

BRIEF DESCRIPTION OF THE DRAWINGS

Various embodiments in accordance with the present disclosure will be described with reference to the drawings, in which:

FIG. 12 illustrates an example flowchart for generating a three-dimensional model in accordance with at least one embodiment;

FIG. 14A-14C illustrate an example second view of a process for distributing projection errors in accordance with at least one embodiment;

FIG. 15 illustrates an example flowchart for projection error on a three-dimensional model in accordance with at least one embodiment;

DETAILED DESCRIPTION

Systems and methods in accordance with various embodiments of the present disclosure may overcome one or more of the aforementioned and other deficiencies experienced in conventional approaches to providing image information of an object. In particular, various approaches provide for the generation of three-dimensional (3D) models of objects. For example, three-dimensional depth data of an object can be captured from viewpoints around the object using an image sensor. In this example, the image sensor simultaneously captures two-dimensional image data where the (x, y) coordinates of the image data is preregistered to (x, y, z) coordinates of the depth data. Additionally, a camera can simultaneously capture second image data of the object from each viewpoint around the object. Accordingly, features between images captured by the image sensor and the camera can be extracted and compared to determine a mapping between the camera and the image sensor. The camera, in this example, is capable of capturing higher resolution images than the image sensor. Therefore, determining the mapping between the camera and the image sensor enables higher resolution images to be mapped to a 3D location of the object captured in the depth data.

Once the mapping between the camera and the image sensor is determined, a second mapping between adjacent viewpoints can be determined for each image around the object. In this example, each viewpoint overlaps with an adjacent viewpoint. Therefore, features extracted from two adjacent and overlapping viewpoints are matched to determine their alignment. This process of matching an image to each of its adjacent and overlapping images is repeated for each image. Accordingly, a 3D point cloud can be generated for the object using the depth data and the images captured by the camera can be projected on the surface of the 3D point cloud using the determined mapping between each adjacent viewpoint to generate the 3D model of the object.

Various other functions and advantages are described and suggested below as may be provided in accordance with the various embodiments.

Figure 1:
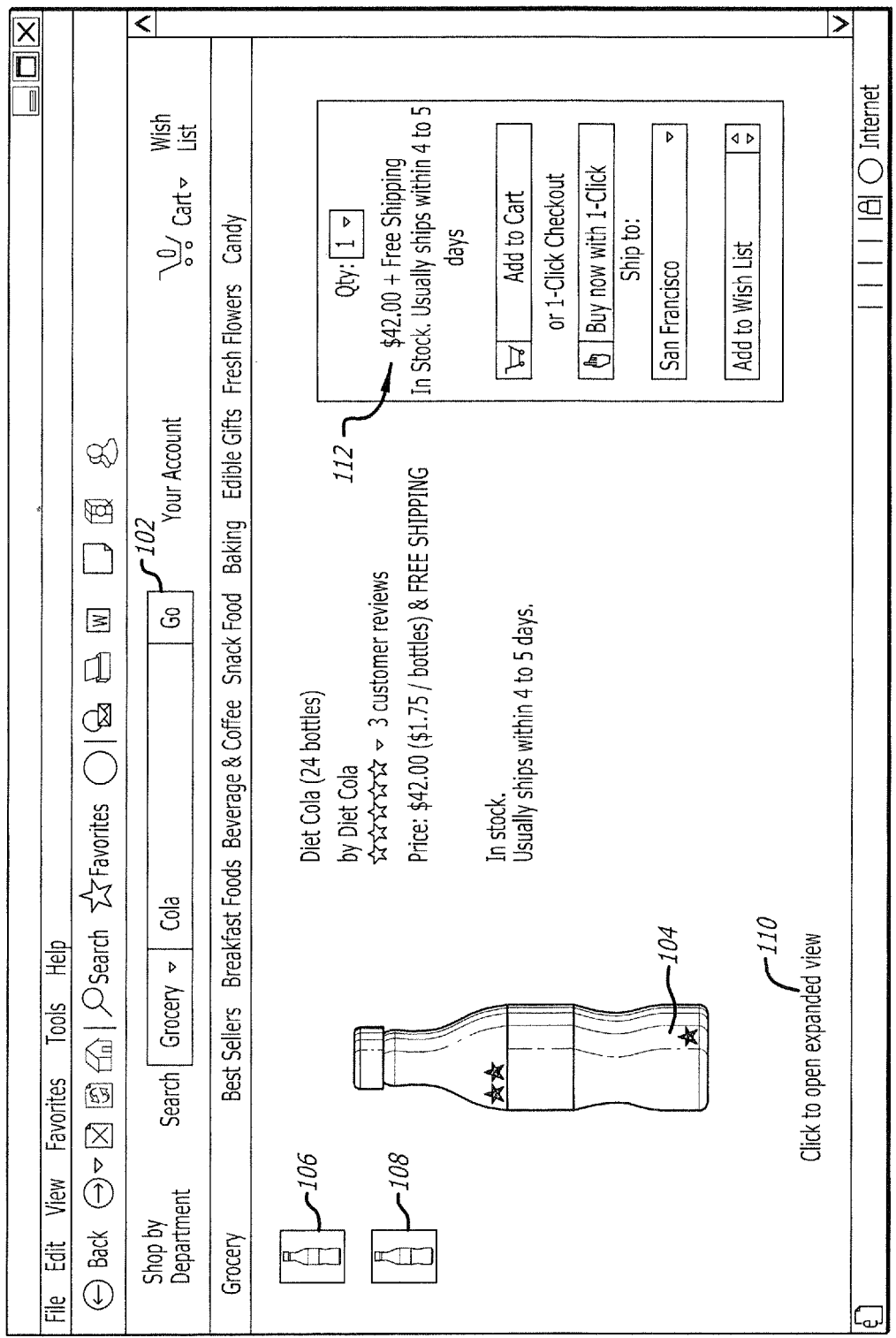
FIG. 1 illustrates an example product page available for purchase from an electronic marketplace in accordance with at least one embodiment.
Figure 2A:
FIGS. 2A-2B illustrates example three-dimensional view of products displayable by an electronic marketplace in accordance with at least one embodiment.
Figure 2B:
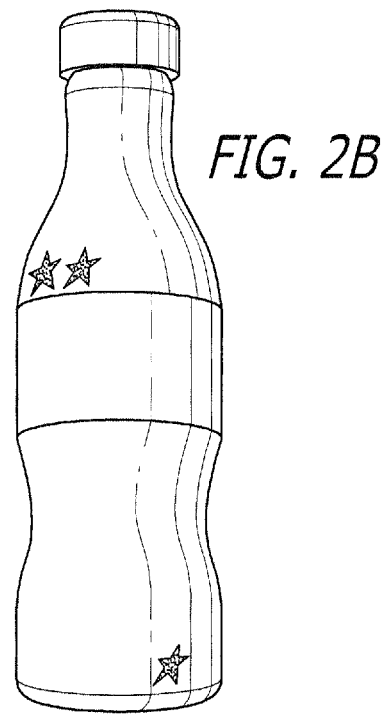

FIG. 1 illustrates an example product page 100 for product 104 available for purchase from an electronic marketplace in accordance with at least one embodiment. While shopping on online, users are interested in knowing as much information about a product they are interested in purchasing. For example, a user can search for product 104 by providing the name or title of product 104 in search field 102, view multiple views (106, 108) of product 104, view enlarged versions 110 of product 104, and add product 104 to virtual shopping cart 112 to purchase product 104. Electronic marketplaces go through extensive procedures to gather and provide product information, of which, product visualization is one of the most important. Many of these electronic marketplaces enable users to view high resolution images, videos, or animations of products. These mediums are an effective way to view the product, but are lacking in at least a few respects, such as being able to interact with the product, move the product around, view the product from different angles and zoom levels, and the like. Such features, however, can be simulated using 3D models of products. FIGS. 2A-2B illustrates two example three-dimensional views of product 104 displayable by an electronic marketplace in accordance with at least one embodiment. In this example, FIG. 2A illustrates a downward perspective view and FIG. 2B illustrates and upward perspective view of product 104. These views would not be possible using single images and a video or animation may provide a similar view, but the user may have to wait of that view to be displayed, as oppose to immediately manipulating the 3D product to the view of the user's choice.

As discussed above, various types of data and techniques have been used to create 3D models where each has their own set of pros and cons. These techniques begin with capturing image data with a set of color camera images of the object taken from arbitrary viewpoints. Salient points or features between images can be matched using techniques such as Structure from Motion (SFM), Visual Simultaneous Localization and Mapping (Visual SLAM), and Bundle Adjustment (BA) to estimate relative camera viewpoints along with a sparse structure of the object. Sparse structure, however, is not suitable to create a photorealistic renderings needed for visualization and interaction. Other techniques augment cameras with 3D time-of-flight sensors (e.g., LIDAR). While such setups can generate high quality 3D models, they require extensive calibration and long capture times. Accordingly, such disadvantages of can be overcome using commercially available sensors that simultaneously capture real-time depth and color data that are pre-calibrated to provide pixel resolution depth data. This pixel resolution depth data enables the creation of dense 3D models and the registered color data enables the rendering of these models with photo-realistic texture. Additionally, such a setup is easily replicable enabling scaling of the data capture process for a large number of products. Since, however, the color imagery from such a sensor is not high quality, the image data is augmented with a hi-resolution camera. Accordingly, the depth data from sensor is mapped to hi-resolution camera using matching features between the registered color data from the sensor and the high resolution images from the camera to determine (x, y, z) coordinates for the high resolution images.

Different applications and object geometries dictate different 3D models requirements. For example, using models for matching against user images may only require a coarse structure of the object. Such a model can be provided using simpler algorithms, whereas, enhancing the user experience for visualization and interaction requires high quality photo-realistic rendering of a model that requires a more complex algorithm. Similarly, different product geometries and materials can require different complexities in algorithms and systems to create these models. For example, generating a model for a box of cereal (e.g., a cuboid made of cardboard/paper) is much easier than a bag of chips in transparent packaging. Towards generating coarse models, Thus, specific techniques for generating coarse models that cater to wide categories of products, such as cuboids and cylindrical objects, have been developed to simplify the process for these shapes. Accordingly, the algorithms utilize different available geometric and photometric constraints ingrained in the capture setup, thus, enhancing the robustness of the entire system.

Figure 3:
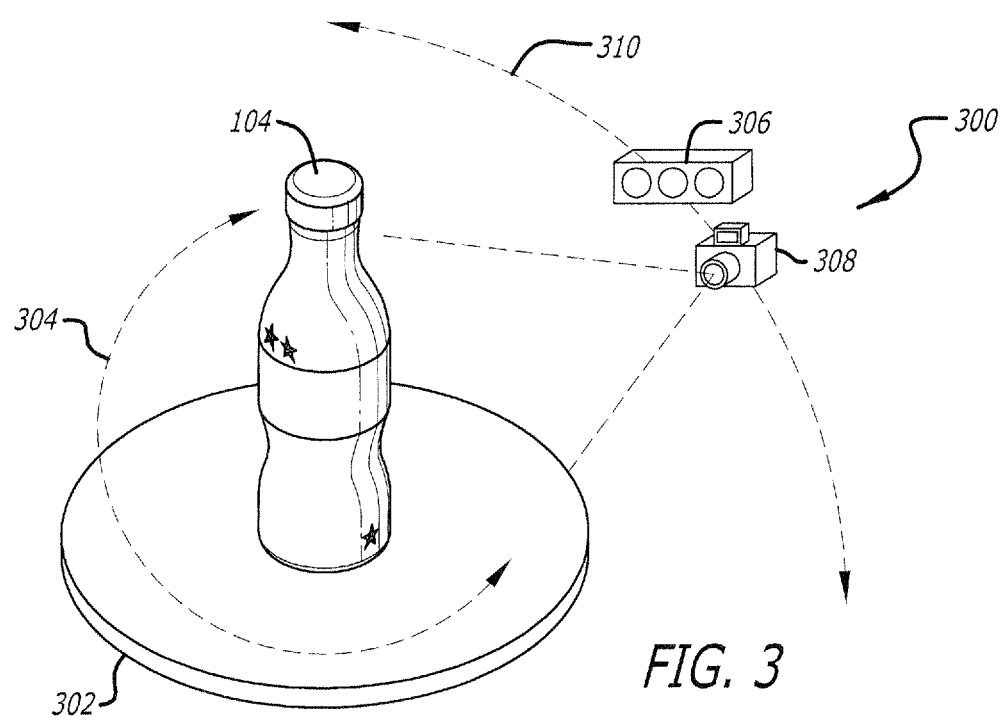
FIG. 3 illustrates an example data capture setup for capturing images of products from various angles and elevations in accordance with at least one embodiment.

FIG. 3 illustrates an example data capture station 300 for capturing images of products from various rotation angles 304 and elevations 310 in accordance with at least one embodiment. Data capture station 300 consists of rotation platen 302 on which product 104 is placed. Platen 302 is connected to a computer controlled servo motor. A sensor bundle including the depth sensor and the camera is placed on an arc going from the side of platen 302 corresponding to a side elevation view to the top of the arc corresponding to a top view of product 104. The motion of the sensor bundle along the arc is controlled by another servo motor. A programmable interface, in this example, can be created to control the rotation of platen 302, elevation of the sensor bundle, zoom/focus of the sensors (306, 308), and capture the images. Platen rotation or camera elevation change simulates the scenario where product 104 is stationary and the sensor bundle is changing its viewpoint.

Figure 4A:
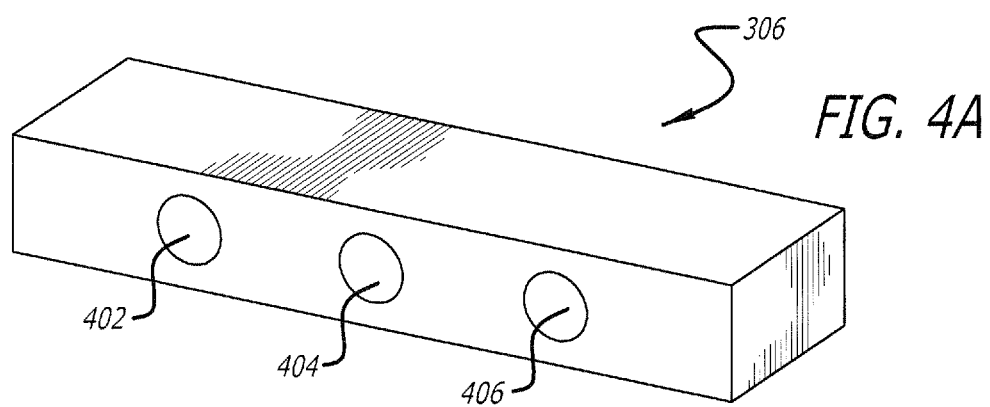
FIG. 4A illustrates an example depth sensor for capturing three-dimensional data for a product in accordance with at least one embodiment.
Figure 4B:
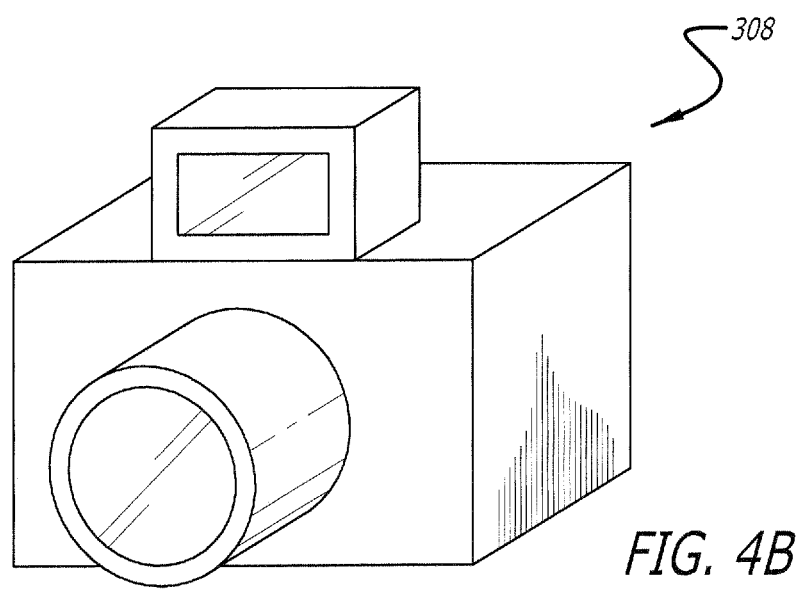
FIG. 4B illustrates an example high resolution camera for capturing high resolution image data for a product in accordance with at least one embodiment.

As mentioned above, sensor 306 simultaneously captures pre-registered depth and color images of object 104, in this example, from different camera viewpoints or rotation angles 304. FIG. 4A illustrates an example depth sensor 306 for capturing three-dimensional data for a product in accordance with at least one embodiment. Sensor 306 includes infrared (IR) emitter 402 and IR depth sensor 406. IR emitter 402 emits infrared light and depth sensor 406 detects and reads IR beams that are reflected back. The reflected beams are converted into depth information measuring the distance between an object and sensor 306. Additionally, sensor 306 includes RGB color sensor 404 that stores three channel data enabling color image data capture. Thus, IR depth sensor 406 and RGB color sensor 404 are pre-registered and calibrated enabling, for example, an (x, y, z) coordinate of a point in an two-dimensional image captured using RGB color sensor 404 to be known based on a pre-determined mapping. For such commercially available sensors, the color images are of a relatively low resolution and, thus, not suitable for rendering on top of (or projecting onto) a model. Thus, the capabilities of sensor 306 are augmented with a high-resolution single-lens reflex camera (SLR) color camera, for example, placed rigidly with respect to sensor 306 in data capture station 300. Accordingly, FIG. 4B illustrates an example high resolution camera 308, such as a single-lens reflex camera (SLR) for capturing high resolution image data for a product in accordance with at least one embodiment. Thus, sensor 306 and high resolution camera 308 are mounted in a fixed position relative to each other on a mechanical arc of data capture station 300.

For a single product, multiple triplets of images are captured from different pre-configured viewpoints. Because of the controlled setup of data capture station 300, the positions of sensor 306 and high resolution camera 308 with respect to each other and the product are known. Note that due to imperfections in the setup, these positions have errors, which we correct using various Computer Vision and Graphics algorithms, discussed in more detail below. Most of these algorithms start by matching nearby viewpoints, which are stored as the part of the capture process. For each viewpoint, we thus have a triplet of images, a) Depth image D from the sensor, b) Registered color image L from the sensor, and c) Color image H from the high-resolution camera. Thus, the final output of the data capture process is:

1. Total number of captured viewpoints—N.
2. Image triplet for each viewpoint—$\{D_i, L_i, H_i\}_{i=1}^{N}$.
3. Camera viewpoint described as a rotation matrix and translation vector for each viewpoint—$\{R_i, t_i\}_{i=1}^{N}$.

Accordingly, generic algorithms suitable for all kinds of objects are used during a Coarse Modeling stage. In this stage, the manufacturer provided calibration parameters for sensor 306 are used to compute a 3D point cloud for each viewpoint in their respective frames of reference. The data from all of these viewpoints needs to be fused into a single reference frame to get the final 3D model. One option would be to register the color images from sensor 306 and the 3D points from neighboring viewpoints. This approach doesn't work in practice due to the low color resolution of sensor 306. Instead, high-resolution images from high resolution camera 308 are used as the texture, skin, or outward surface of the 3D model mapped to the model through image registration. For this, as a second step, a mapping sensor 306 to high resolution camera 308 is determined, effectively converting this combination of sensors into a high resolution depth sensor. As a third step, high resolution SLR images and their accompanying depth data is registered to their neighboring viewpoints. In order to obtain a mapping between these viewpoints, an estimation between features of each viewpoint is made and there is error in estimation. This estimation error is compounded as more viewpoints are mapped to previously mapped and estimated adjacent viewpoints. Accordingly, as a result of this increasing estimation error, the cumulative transformation computed using each individual image registration tends to diverge. For example, if an individual viewpoint lies on a circle at point A, the total transformation between coming back to the first viewpoint after accumulating all transformations on the circle might not be an identity transformation and point A will not line up between the first and final viewpoints. Thus, as a final step, these open-loop errors are corrected by adjusting each viewpoint to distribute this error. Each of these steps is described in detail below.

Figure 5:
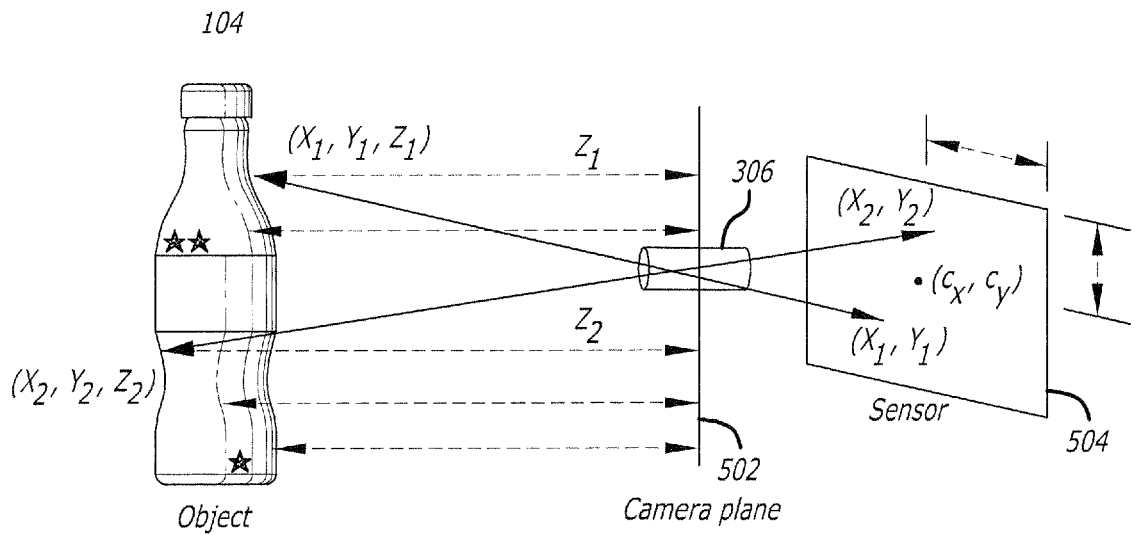
FIG. 5 illustrates an example process for capturing data using a depth sensor and a high resolution camera that can be used in accordance with at least one embodiment.

FIG. 5 illustrates an example process for capturing data using sensor 306 and, thereby, determining 3D points for individual viewpoints that can be used in accordance with at least one embodiment. The depth image $D_i$ for i-th viewpoint stores the perpendicular distance between camera plane 502 of sensor 306 and physical point corresponding to each pixel $L_i$. This is same as the z-coordinate for an image frame centered at the low resolution camera of sensor 306, xy-plane along sensor plane 504, and z-axis jutting out of the sensor. The manufacturer provided calibration parameters contain the focal lengths ($f_x$, $f_y$) and optical center ($c_x$, $c_y$) of the low resolution camera which are used to obtain the intrinsic camera projection matrix K that relates a 3D point (X, Y, Z) in a reference frame centered at the camera to its corresponding image projection (x, y). Given the projection matrix and depth data for each pixel, its corresponding 3D point can be estimated as follows:

$$K = \begin{bmatrix} f_x & 0 & c_x \\ 0 & f_y & c_y \\ 0 & 0 & 1 \end{bmatrix} \Rightarrow \alpha \begin{bmatrix} x \\ y \\ 1 \end{bmatrix} = K \begin{bmatrix} X \\ Y \\ Z \end{bmatrix} \Rightarrow \begin{bmatrix} X \\ Y \\ Z \end{bmatrix} = Z \cdot K^{-1} \begin{bmatrix} x \\ y \\ 1 \end{bmatrix}$$

Figure 6:
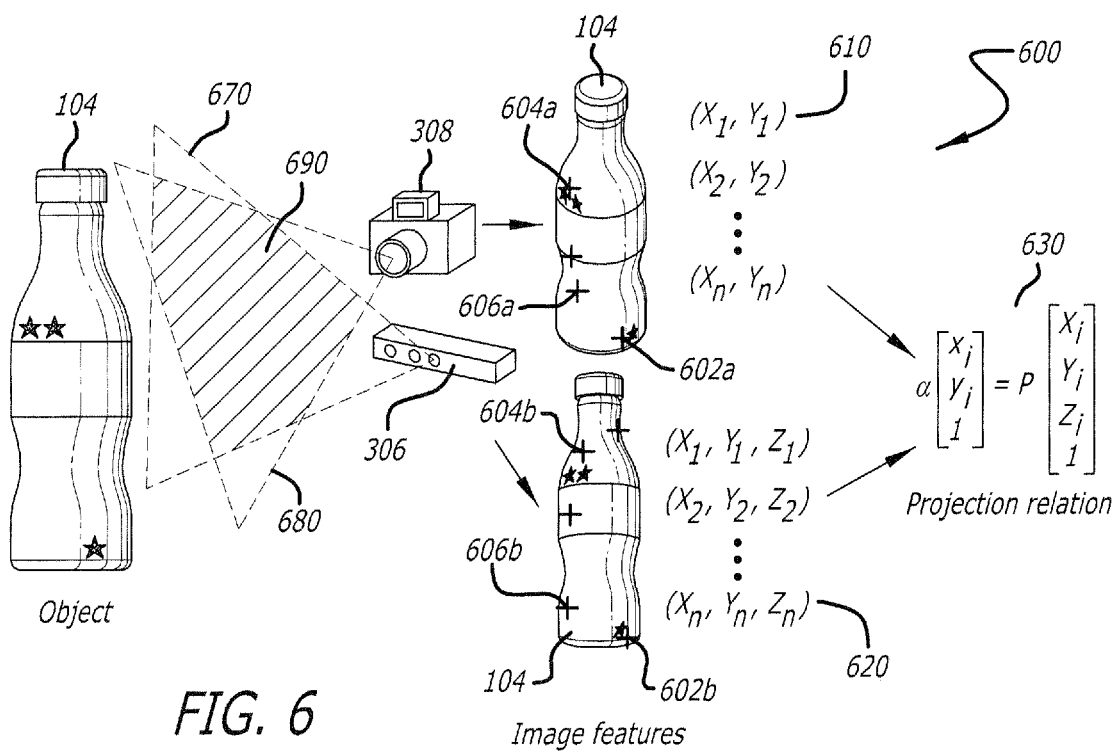
FIG. 6 illustrates an example process for mapping depth data from the depth sensor to image data from the high resolution camera in accordance with at least one embodiment.

FIG. 6 illustrates an example process 600 for mapping depth data from sensor 306 to image data from high resolution camera 308 in accordance with at least one embodiment. For each viewpoint, 3D points in a respective reference frame of sensor 306 are captured and the corresponding 3D points from high resolution image data from high resolution camera 308 are determined. This mapping is known as camera resectioning and utilizes an extrinsic projection matrix, which is a 3×4 matrix that relates a 3D point in an arbitrary reference frame to its 2D projection in an image. Since sensor 306 and high resolution camera 308 are placed rigidly with respect to each other, the projection matrix remains constant for all viewpoints. However, since sensor 306 and high resolution camera 308 capture image data from slightly different angles, they will each have a slightly different field of view. In this example, sensor 306 has first field of view 670 and high resolution camera 308 has second field of view 680 that overlaps in overlapping field of view 690. Thus, in order to estimate this projection matrix, image features suitable for matching are extracted from a low resolution image from sensor 306 and high resolution image from high resolution camera 308 from overlapping field of view 690. Image features are usually detected at salient locations (e.g., corners and blobs in an image) and described as a characteristic vector using the color content around the location. Any feature extraction algorithm can be used to extract image features, (e.g., Scale-invariant feature transform (SIFT), Speeded Up Robust Features (SURF), Accumulated Signed Gradient (ASG), etc.).

Accordingly, the similarity between characteristic vectors for feature from the low resolution image captured by sensor 306 and the high resolution image captured by high resolution camera 308 are computed using multiple metrics, such as scalar product, inverse of Euclidean distance, and the like. The images features (or feature points) between the low resolution image captured by sensor 306 and the high resolution image captured by high resolution camera 308 are extracted using a feature extraction algorithm and the feature pairs with a high similarity scores are identified as putative correspondences. These putative correspondences are accumulated for each viewpoint. Accordingly, for each putative correspondence pair $\{f_i, g_i\}$, $f_i=(x_i, y_i)$, which corresponds to the 2D position of a first image feature (e.g., first image features 602a, 604a, 606a) from high resolution camera 308, and $g_i=(X_i, Y_i, Z_i)$, which corresponds to the 3D position of a second image feature (e.g., second image features 602b, 604b, 606b) from sensor 306. Many techniques can be used to estimate a mapping P between these two sets of features using these putative correspondences. Least square estimation assumes these correspondences to be corrupted by Gaussian noise and hence cannot deal with outliers, or incorrect correspondences. Thus, a technique, such as Random Sampling Consensus (RANSAC) which, unlike least squares estimation, can tolerate outliers is used to estimate the mapping P. Accordingly, RANSAC randomly selects a minimal set of these correspondences that can be used to estimate the mapping P and, thus, computes the error in fit for all other correspondences using this mapping. Thus, the relation between correspondences is as follows:

$$\alpha \begin{bmatrix} x_i \\ y_i \\ 1 \end{bmatrix} = P \begin{bmatrix} X_i \\ Y_i \\ Z_i \\ 1 \end{bmatrix}$$

Therefore, for a given maximum number of sampled iterations and maximum allowable error-in-fit, RANSAC selects the best fit mapping it can find. Once the mapping is estimated, a dense 3D point cloud of depth data from sensor 306 is projected onto each high resolution image from high resolution camera 308. Accordingly, for every pixel of high resolution camera 308, a physical 3D point in a reference frame corresponding to sensor 306 can be determined.

Figure 7:
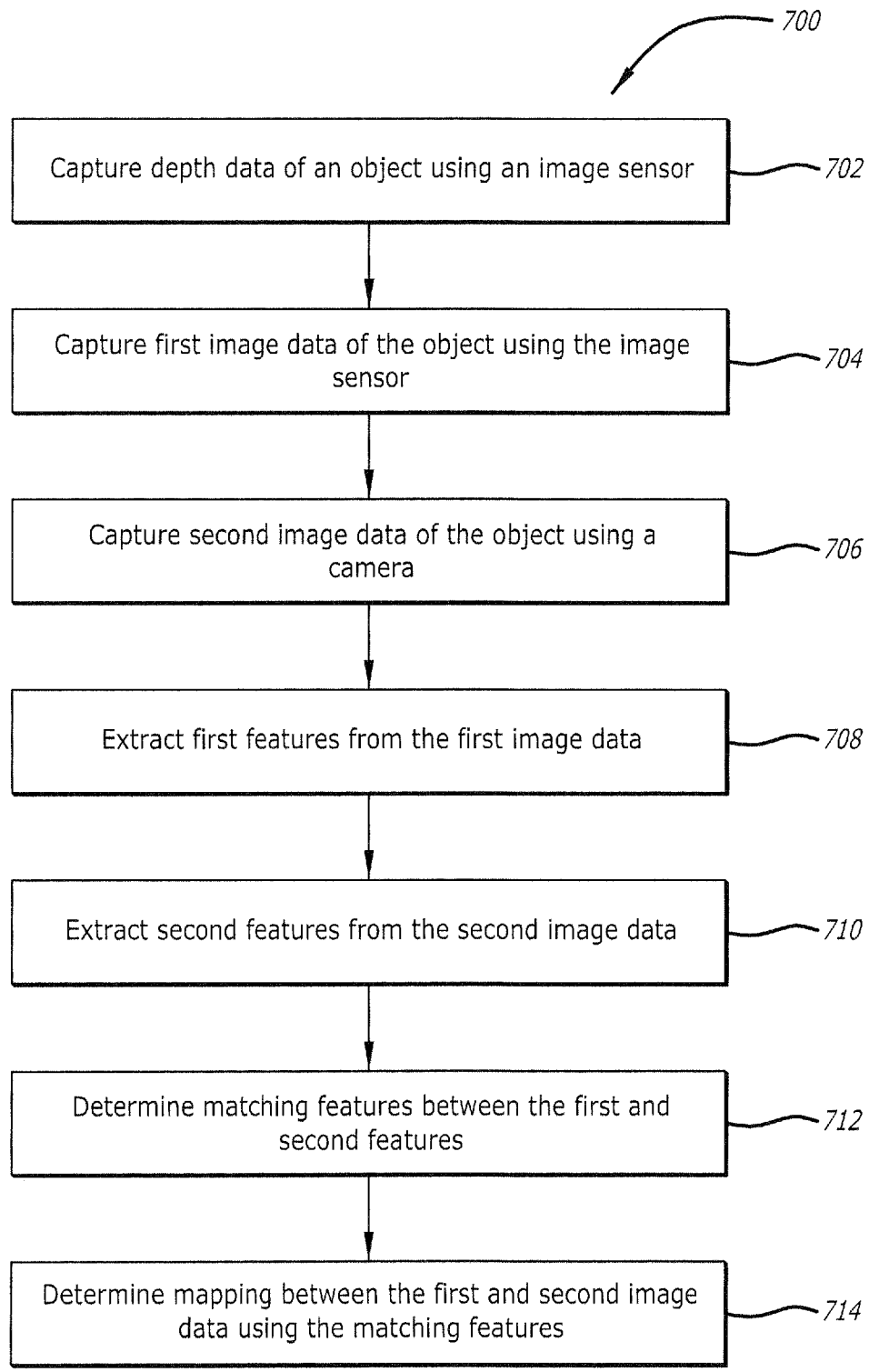
FIG. 7 illustrates an example flowchart for mapping depth data to high resolution image data in accordance with at least one embodiment.

FIG. 7 illustrates an example flowchart 700 for mapping depth data to high resolution image data in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, depth data of an object is captured using an image sensor 702. Simultaneously, the image sensor captures first image data 704 of the object, which is relatively low resolution RGB color image data not necessarily suitable to creating 3D models fit for display and presentation to users via an electronic marketplace. Additionally, second image data of the object is captured using a high resolution camera 706. Thus, in order to generate a high quality 3D model using a commercially available depth sensor that additionally captures low resolution RGB data, a mapping between the low resolution image data and high resolution image data from the high resolution camera is determined.

In order to determine this mapping, first features are extracted from the low resolution first image data 708 and second features are extracted from the high resolution second image data 710. As described above, any suitable feature extraction algorithm, such as SIFT, SURF, ASG, or the like, can be used to extract these features. Accordingly, matching features between the first and second image data are determined 712. Thus, in this example, a mapping between the first and second image data using is determined 714 using these matching features. As described above, RANSAC randomly selects a minimal set of these matching features in order to estimate the mapping and, thus, compute the error in fit for all other features between the first image data and the second image data.

Figure 8:
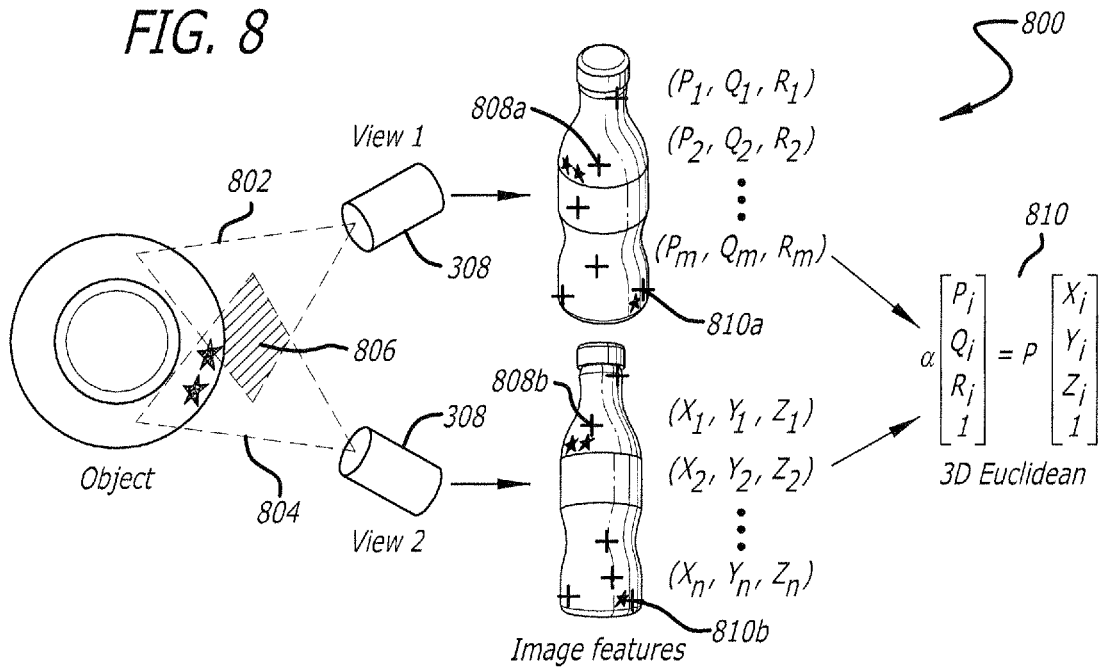
FIG. 8 illustrates an example process for registering captured image data from the high resolution camera for two different views in accordance with at least one embodiment.

Once the mapping between the low resolution image data from sensor 306 and high resolution image data from high resolution camera 308 is determined, a second mapping between high resolution image data of adjacent views (i.e., adjacent and overlapping high resolution images captured by high resolution camera 308) is determined. FIG. 8 illustrates an example process 800 for registering captured image data from the high resolution camera for two different views in accordance with at least one embodiment. The data for each individual viewpoint is captured in its respective frame of reference and, in order to create a 3D model, this data is brought in a single frame of reference. Based on the relative viewpoints of camera 308 for each reference frame (object is stationary and the camera is moving), the 3D points of object 104 are perceived as different 3D locations in two different viewpoints. If the relative viewpoints are known, a transformation between the locations from one viewpoint to another can be determined, thereby, compiling all 3D points in the same reference frame. The relative viewpoint between viewpoints can be described as a 3D Euclidean transformation that includes a rotation and translation.

In order to compute the relative viewpoints, image features are detect in images between viewpoints. Since each of these images has accompanying depth data, as described above, every feature's 3D location is known. Similar discussed above, a set of putative correspondences (e.g., 808a and 808b, 810a and 810b) between images of adjacent viewpoints are determined, and a 3D Euclidean transform between putative correspondences is determined using RANSAC. Accordingly, in this example, first viewpoint 802 (view 1) captures first feature points (808a, 810a), which are also detected in an adjacent viewpoint, second viewpoint 804 (view 2) as second features (808a, 810a) in overlapping portion 806 of first viewpoint 802 and second viewpoint 804. This technique works best if enough features exist for every pair of viewpoints (i.e., objects which are textured all throughout and requires no initial estimates of transformation). In this example, initial estimates for each viewpoint are known based on data capture station 300. For objects with no texture, a color based Iterative Closest Point (ICP) algorithm is used to estimate the relative viewpoints for each viewpoint. Thus, in one example, a 3D Euclidean RANSAC followed by color based ICP can be used. For data capture station 300, the images are captured from a set of predefined fixed viewpoints. Many transformations between these viewpoints remain the same (e.g., transformation between frontal and 30 degree rotated viewpoint is the same as that of 30 degree and 60 degree viewpoints). For robustness, all matches among the viewpoint pairs are accumulated using the same transformation and a single transformation is estimated.

Once the relative viewpoints between every pair of neighboring viewpoints are estimated, one of the viewpoints is chosen as a reference viewpoint. The relative viewpoint of $i^{th}$ camera with respect this reference viewpoint is computed as a cascade of relative neighboring viewpoints starting from reference viewpoint to the $i^{th}$ viewpoint. Using these relative viewpoints with respect the reference viewpoints, all 3D points are projected to the reference viewpoint to get the model in a single reference frame.

Figure 9:
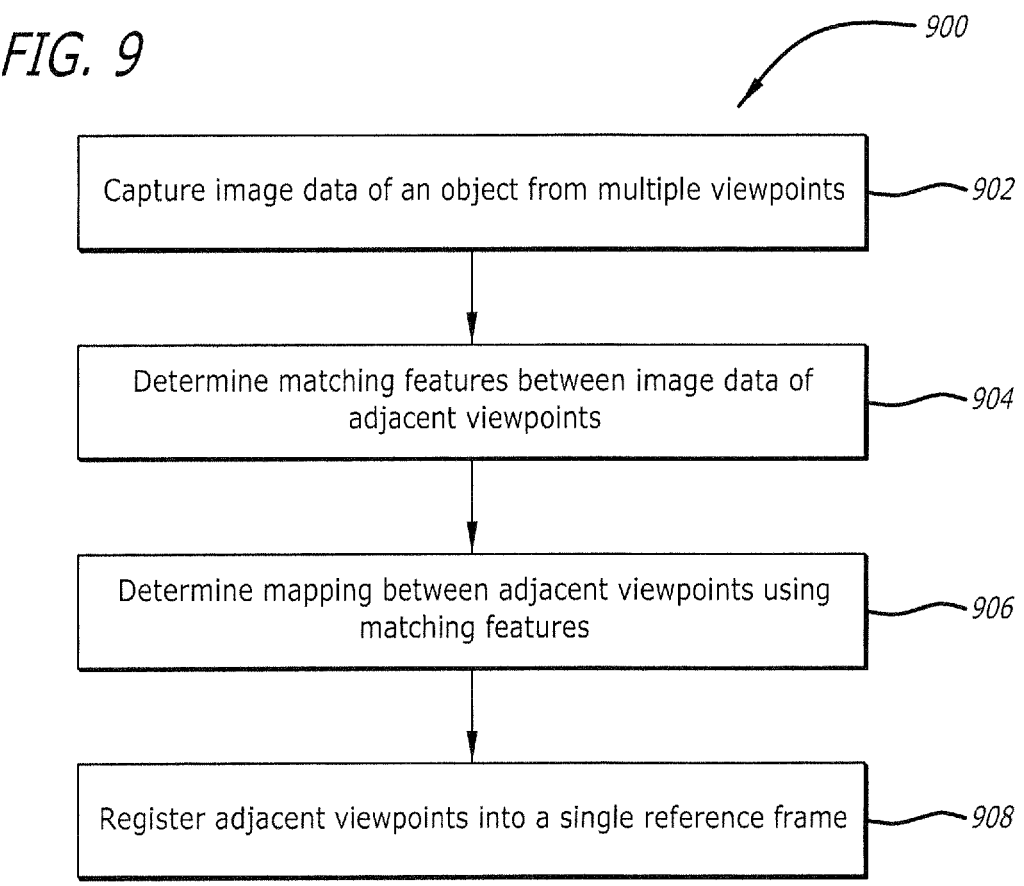
FIG. 9 illustrates an example flowchart for registering captured image data from for two different views in accordance with at least one embodiment.

FIG. 9 illustrates an example flowchart 900 for registering captured image data from for two different views in accordance with at least one embodiment. In this example, image data of an object is captured from multiple viewpoints 902. As above, depth data of the object is captured using an image sensor that additionally captures low resolution RGB color image data not necessarily suitable to creating 3D models. Thus, second image data of the object is captured using a high resolution camera. In this example, matching features between image data from the high resolution camera of adjacent and partially overlapping viewpoints is determined 904. Accordingly, a mapping between adjacent viewpoints using the matching features is determined 906. As described above, any suitable feature extraction algorithm, such as SIFT, SURF, ASG, or the like, is also used to extract these features and RANSAC is able to determine the mapping between adjacent viewpoints using these features. In this example, however, a Euclidian mapping technique is used and a projective mapping technique is used to determine the mapping between the low resolution image data and the high resolution image data.

Accordingly, the imaged data or images of adjacent viewpoints are registered into a single reference frame to generate the surface or texture of the 3D model 908. As described above, the 3D model is generated, in part, by registering neighboring viewpoints captured from the high resolution camera where the 3D depth data was obtained by matching low resolution images captured by sensor 306 to the high resolution images captured by high resolution camera 308. Alternatively, an image capture element simultaneously capturing depth data and high resolution image data (thus, obviating the need to match features between low resolution images and high resolution images to obtain the depth data) could be provided. Accordingly, such an image capture element could make use of the teachings described above to generate a 3D model by registering neighboring viewpoints.

Depending upon the application, the algorithms used to create 3D models should satisfy certain requirements. For instance, using models for matching against user images only requires a coarse structure of the object, needing simpler algorithms, whereas, enhancing the user experience for visualization and interaction requires high quality photo-realistic rendered models, needing more complex algorithms. Similarly, different product geometries and materials might require different complexities in algorithms and systems to create 3D models. For instance, creating a model for cereal box which is a cuboid made of cardboard/paper is much easier than a packet of chips in transparent packaging. The coarse modeling stage provides us with an output good for matching, but not for visualization. For this stage, we use global algorithms to make our estimates camera viewpoint more robust. Also, we restrict ourselves to specific shape classes of objects, for which we use parametric models to better estimate the geometry.

Accordingly, the most prevalent parametric shape classes for products sold by electronic marketplaces are cuboids and bottles or cylindrical objects. Since these are the most common, techniques designed to determine whether an arbitrary object fits into one of these categories and efficiently generate a 3D model for either cuboids or bottles is described herein. For a given point cloud, the error-in-fit for either a cuboid or bottle is determined and, if the error-in-fit for either of these shape classes is low, a triangular mesh for the point cloud is created using standard algorithms. If not, to reduce noise, the point cloud is refined or smoothed, and then the triangular mesh is created.

Figure 10A:
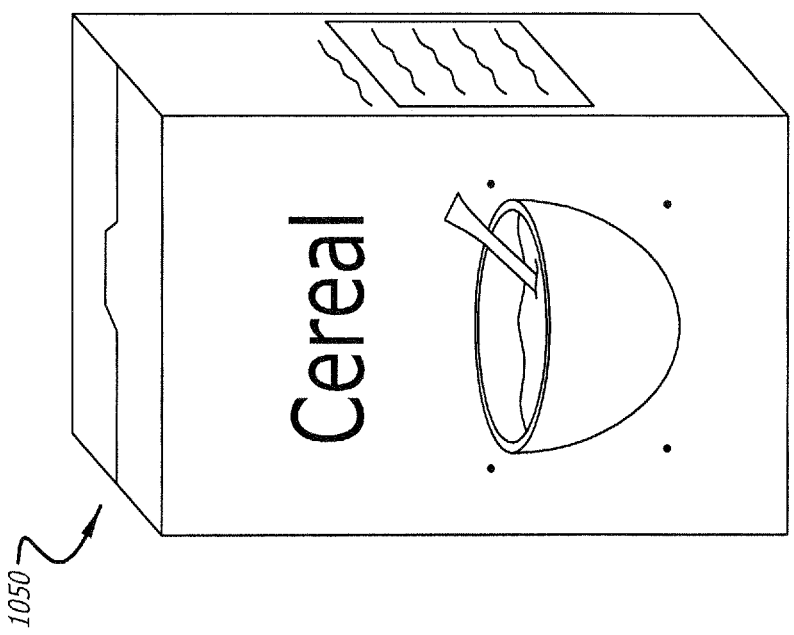
FIG. 10A illustrates an example point cloud for a cuboid shaped product in accordance with at least one embodiment.

FIG. 10A illustrates an example point cloud 1000 for a cuboid shaped product in accordance with at least one embodiment. A cuboid is composed of six planes (1002, 1004, 1006, 1010, 1012) with plane-normals (1030, 1032, 1034) along three perpendicular directions. To estimate these directions, we first randomly select a single point in the point cloud $p_i$, and find k closest points (1020, 1022) to it $\{q_j\}_{j=1}^k$. These points are used to estimate the normal (1030, 1032, 1034) for $p_i$ by fitting a plane to these points. These normals are estimated for a randomly chosen percentage of the entire point cloud and the normal should lie in three principal perpendicular directions. Accordingly, these directions $\{n_1, n_2, n_3\}$ are computed using Principal Component Analysis as the Eigen vectors of the covariance matrix. For the $i^{th}$ iteration of these normal directions, there are two corresponding planes for which the intercepts $\{c_i^1, c_i^2\}$ are estimated, such that the points on the respective planes satisfy $n_i^t p = c_i^j$. Since most points will lie on a plane, a plot of $n_i^t p$ reveals two peaks corresponding to the locations of these intercepts. These points are estimated as local maxima. As a result, initial estimates for these six planes of the cuboid are determined. Further, for every point, plane membership is estimated by comparing its perpendicular distance to each of the estimated planes, and a new plane is fit to these points. This process is repeated until convergence. Then, for each place, the points are uniformly sampled to generate a refined point cloud for the object. The closest points on the original point cloud are compared to the refined point cloud to estimate an error-in-fit, and compare against a threshold to determine whether the object is a cuboid or not.

Accordingly, planes have a unique 3D projection property that if images of a plane is captured from two different viewpoints, a 3×3 similarity transformation called Homography can map pixels from one image to the other. This fact can be used to obtain a set of correspondences for each plane of the cuboid, for different camera viewpoints. The traditional methods for computing a planar homography is to compute image feature correspondences and use RANSAC, as described above. If the camera viewpoints are too different, however, it can be difficult to estimate these feature correspondences. For this reason, the current estimate of the 3D model and camera viewpoints are, thus, used to map the images to closer viewpoints. For these closer viewpoints, the homography is estimated using RANSAC, and this homography can be used to obtain a bigger set of correspondences. A bundle adjustment algorithm can be run on this data, which generates an output including the camera viewpoints and re-estimates the plane equations.

Figure 10B:
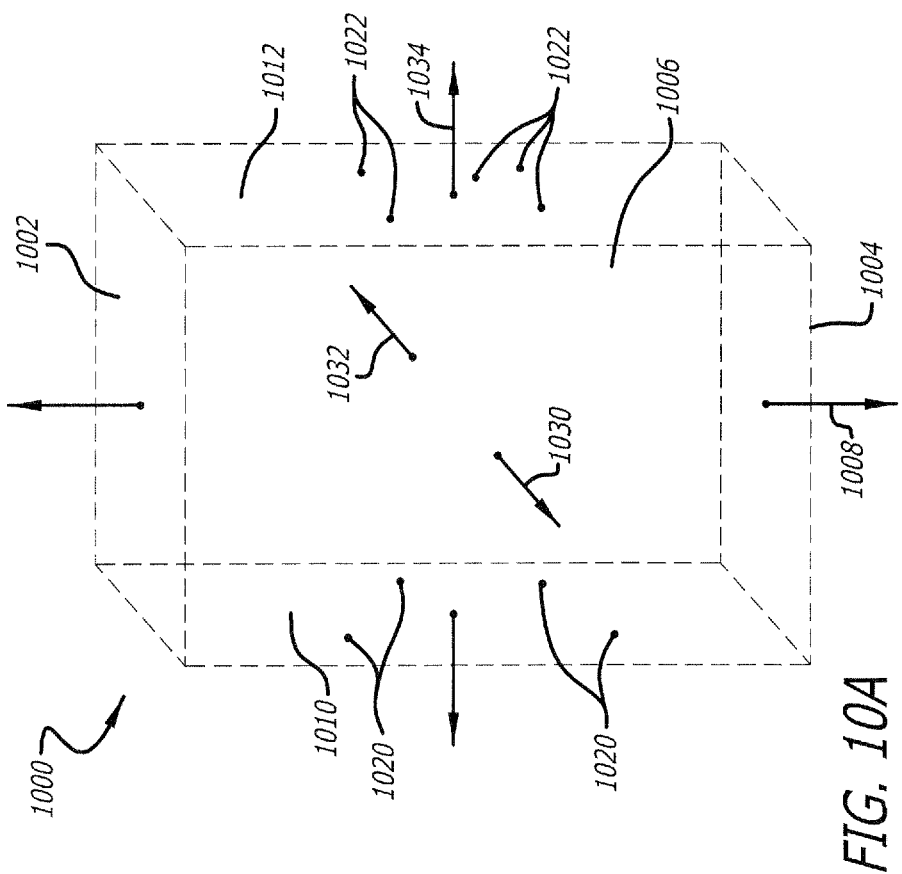
FIG. 10B illustrates an example three-dimensional model of the cuboid shaped product generated by mapping high resolution imaged data to the point cloud of FIG. 10A in accordance with at least one embodiment.

For example, consider camera viewpoints m, n corresponding to images $H_m$ and $H_n$ of the $i^{th}$ cuboid plane having normal $n_i$ and intercept $c_i$ and projection matrices $P_m$ and $P_n$. For every pixel in $(x_i, y_i)$ of image $H_m$, the projection matrix $P_m$ and the 3D mesh of object 1000 is used to estimate the 3D location X', which can be projected to the $n^{th}$ image using $P_n$ to generate a proxy image $H_m^{proxy}$. Features from $H_m^{proxy}$ and $H_n$ are detect and the 3D locations for these features is used to estimate the 3D mesh and the projection matrix $P_n$. These locations, however, are incorrect relative to their true physical locations as a result of algorithmic error. The errors, however, should be close in 3D. This fact can be used to select putative correspondences which have similar feature signatures and are relatively close in 3D (e.g., within a threshold distance). The 3D locations of these correspondences are initialized using the average 3D locations estimated using and $P_m$ and $P_n$, and projection matrices are initialized as $P_m$ and $P_n$. This data can be combined for all viewpoints and analyzed using a Bundle Adjustment algorithm. Bundle Adjustment outputs the modified estimates of projection matrices (poses) and 3D locations of the input correspondences. Accordingly, the camera viewpoints or viewpoints are adjusted based on the estimates determined by the Bundle Adjustment algorithm. Thus, for every correspondence, the camera viewpoint and the initial and modified 3D location are known. A viewpoint transformation between these initial and final locations is estimated and used to modify the 3D point cloud for a respective viewpoint. All individual point clouds for each reference frame are subsequently combined into a single reference frame. Accordingly, FIG. 10B illustrates an example three-dimensional model 1050 of the cuboid shaped product generated by mapping high resolution imaged data to the point cloud of FIG. 10A in accordance with at least one embodiment.

Figure 11A:
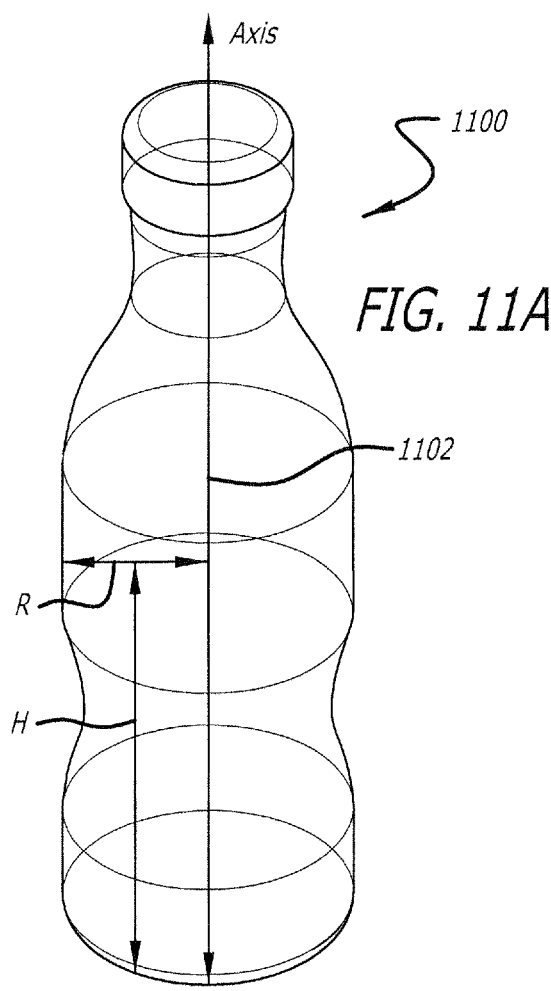
FIG. 11A illustrates an example point cloud for a cylindrically shaped product in accordance with at least one embodiment.
Figure 11B:
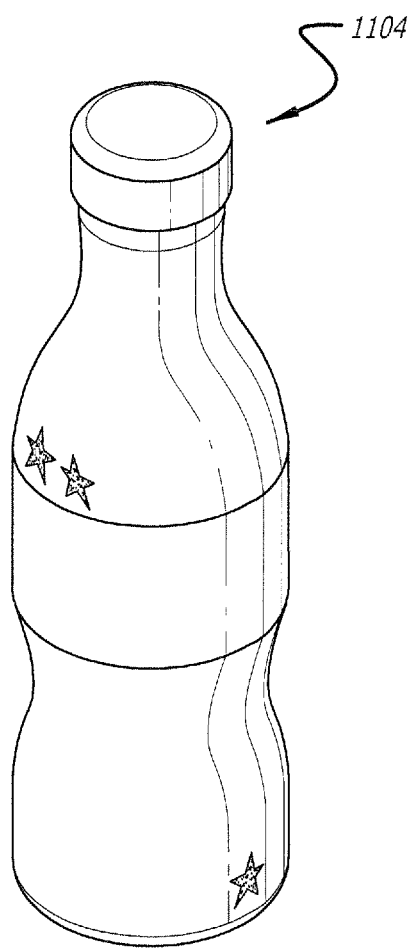
FIG. 11B illustrates an example three-dimensional model of the cylindrically shaped product generated by mapping high resolution imaged data to the point cloud of FIG. 11A in accordance with at least one embodiment.

FIG. 11A illustrates an example point cloud 1100 for cylindrically shaped product 1104 in accordance with at least one embodiment. A bottle is a circularly symmetric object which encompasses a wide variety of objects, including cylinders and cones. Given axis 1102 of the bottle and height H, all points are equidistant from axis 1102, thus, forming a circle. The radii R of these circles form a profile, which can be rotated around axis 1102 to create the shape in 3D. The bottle can thus be parameterized by axis 1102 with direction n passing through a point x', and, profile radii $\{r_j\}$ at heights $\{z_j\}$. Given axis 1102, the profile can be obtained by fitting a circle for points at every height $z_j$. One property of bottles is the center of each circle of the bottle lies on a straight line or axis 1102, which can be used to fit the bottle using an iterative algorithm. Accordingly, 3D points captured when the on the platen 302 on which the object is placed to get an initial estimate of the axis direction n'. Note that since the object is placed on top of the platen 302, the normal direction of the plane is the same as axis direction. Starting with this direction, points of a respective point cloud are transformed so that the z-axis aligns with axis 1102. For every height H, a circle is fit, resulting into an estimated radius $r_j$ and a center $(x_j, y_j)$. Accordingly, points should lie on axis 1102, or in other words, if the current estimate of axis is incorrect, these points will provide a new corrected estimate. This process is repeated for the new estimated axis, iteratively, until convergence. Points on the bottle are then uniformly sampled to generate a refined point cloud for the object. The closest points of the original point cloud are compared to the refined point cloud to estimate an error-in-fit and, if the error-in-fit is greater than a threshold, it is declared a bottle. Thus, a triangular mesh of the refined point cloud is generated for the object. Poisson mesh creation is a suitable algorithm for generating meshes for closed surfaces. Accordingly, FIG. 11B illustrates an example three-dimensional model of the cylindrically shaped product generated by mapping high resolution imaged data to the point cloud of FIG. 11A in accordance with at least one embodiment.

If the error-in-fit for both cuboid and bottle is higher than their respective thresholds, we deem the object as a generic shape class (neither bottle, nor cuboid). For these, we smooth the point cloud by averaging the locations of neighboring points to generate the refined point cloud. Fast implementation for such an averaging exist which use Kd-tree. For robustness to noise, we use an exponential kernel for averaging instead of simple averaging.

FIG. 12 illustrates an example flowchart for generating a three-dimensional model in accordance with at least one embodiment. In this example, a 3D point cloud of an object is generated using depth data 1202. The depth data values are averaged to refine the 3D point cloud 1204. In this example, a triangular mesh of the object is generated from the refined 3D point cloud 1206. In this example, the image data is projected onto the triangular mesh to generate a 3D model of the object 1208.

Figure 13A:
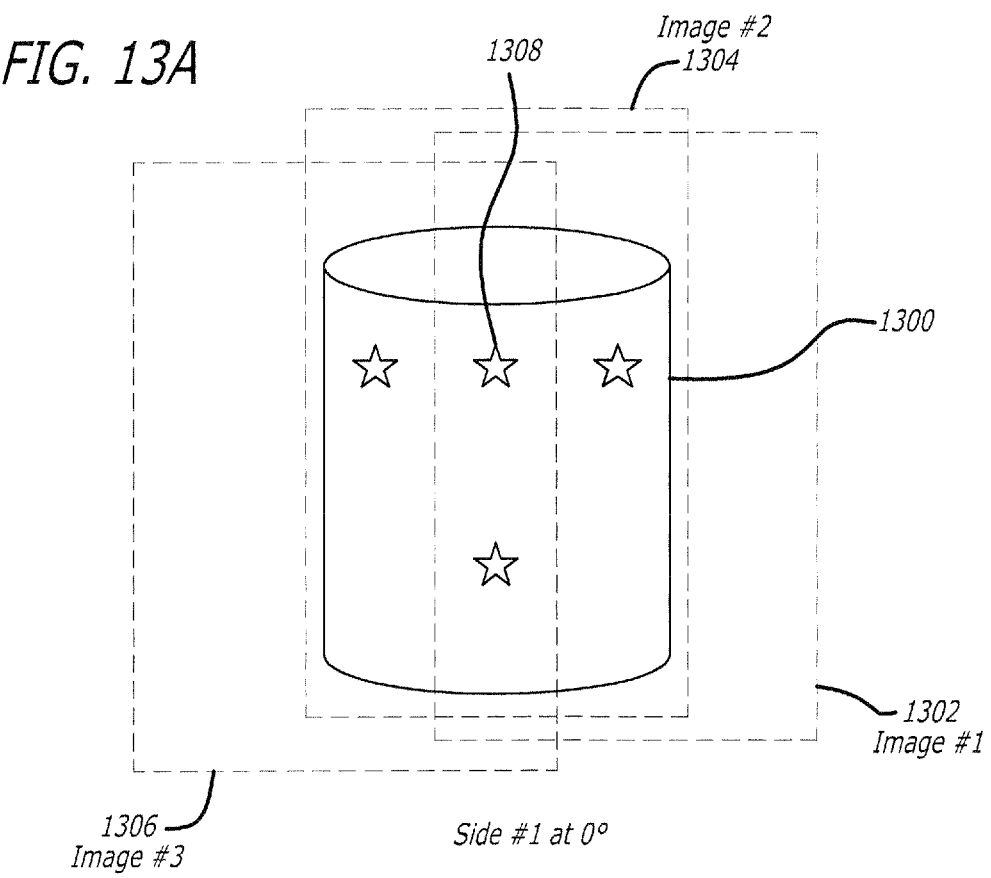
FIGS. 13A and B illustrate an example first view of a process for distributing projection errors in accordance with at least one embodiment.
Figure 13B:
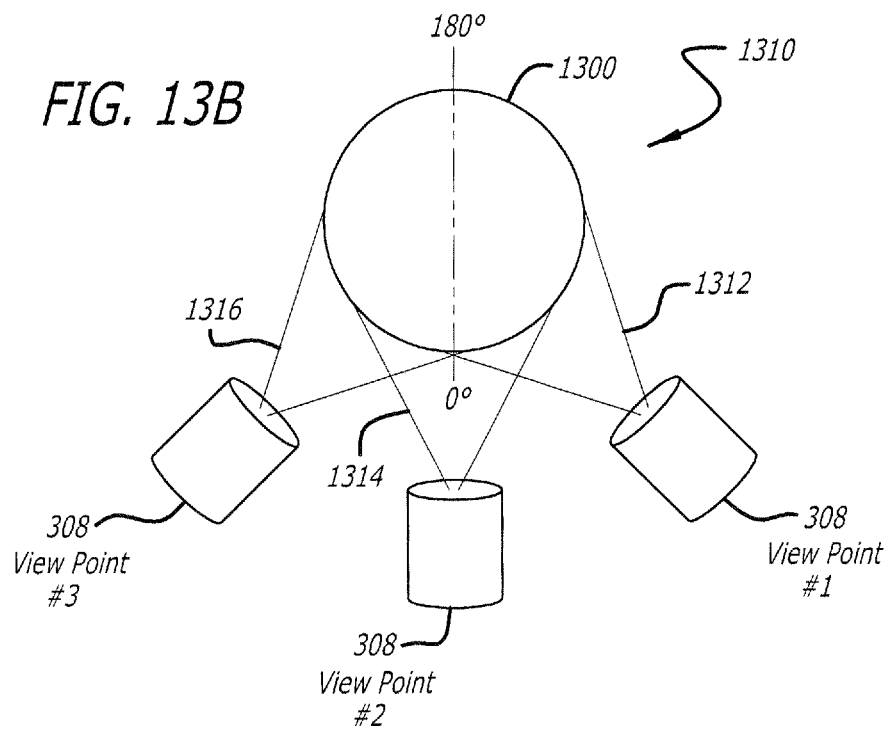

FIGS. 13A and 13B illustrate an example first view of a process for distributing projection errors in accordance with at least one embodiment. FIG. 13A illustrates an object 1300 with features 1308 captured in images (1302, 1304, 1306) from three overlapping and adjacent viewpoints. FIG. 13B shows a top view of object 1300 and the relative location from where each of images (1302, 1304, 1306) are captured. In this example, image 1302 is captured from a first viewpoint having first field of view 1312, image 1304 is captured from a second viewpoint having second field of view 1314, and image 1306 is captured from a third viewpoint having third field of view 1316. The viewpoint of each camera with respect a reference viewpoint (e.g., Image # 1 1302) is computed using neighboring viewpoints. The neighboring viewpoint estimation will, however, have a degree of error due to algorithm estimation and sensor input. When these errors are combined, the overall error increases resulting in a divergence between relative viewpoints with respect the reference viewpoint (e.g., Image # 1 1302).

Figure 14A:
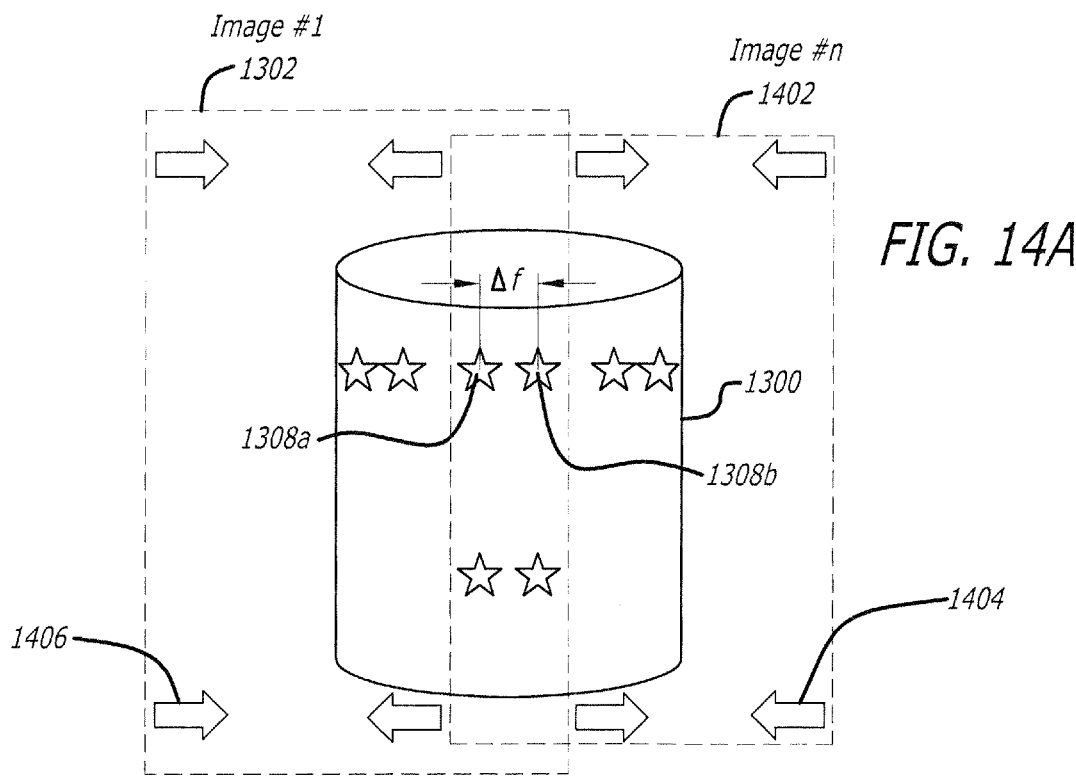
Figure 14B:
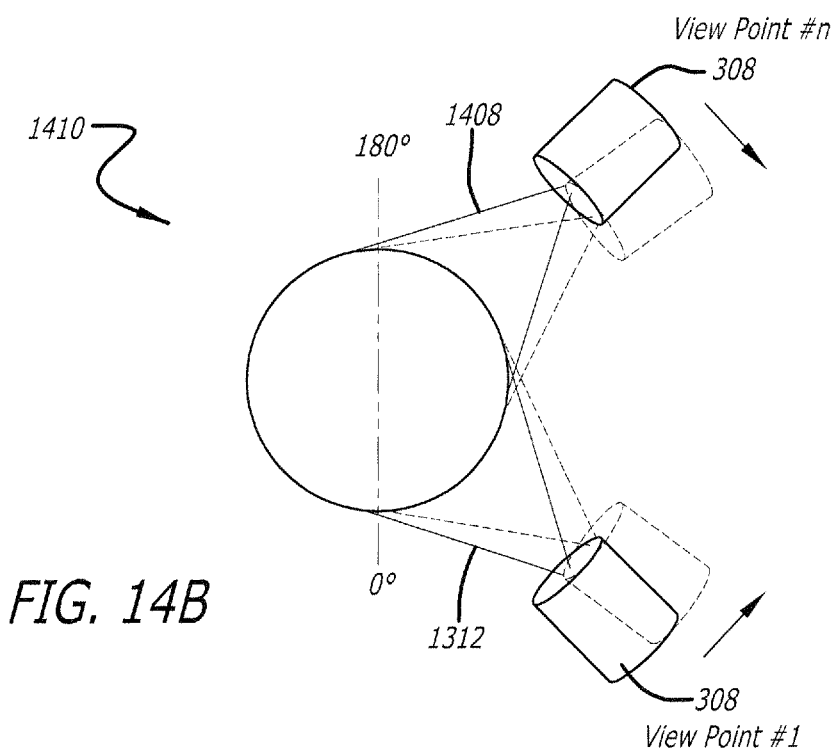

For example, referring back to data capture station 300, object 1300 rotates on platen 302 and the camera is stationary, which simulates object 1300 being stationary and the camera rotating in a circle from various elevation angles. Given the estimated neighboring relative viewpoints, the total viewpoint change can be estimated starting at a particular viewpoint, traversing all viewpoints on the circle clockwise (or counter clockwise), and returning to that particular viewpoint. FIGS. 14A-14C illustrate an example second view of a process for distributing projection errors in accordance with at least one embodiment. In this example, the particular viewpoint is viewpoint # 1, corresponding image # 1 1302, which was matched and aligned with viewpoint # 2, corresponding image # 2 1304, and so on all the way around object 1300 until reaching viewpoint # n, corresponding image # n 1402, which is supposed to, in the absence of all error, perfectly match up with viewpoint # 1 (e.g., image # 1 1302). Thus, this final computed relative viewpoint between viewpoint # n and viewpoint # 1 should be Identity, however, due to the estimation error, this is not the case. This is known as the open loop problem, which arises due to estimating the viewpoints locally, without any global constraints.

FIG. 15 illustrates an example flowchart for projection error on a three-dimensional model in accordance with at least one embodiment. To correct these errors, each of relative neighboring viewpoints is modified so that the error is distributed across all transformations made to each viewpoint, which is achieved in an iterative manner. Thus, in this example, a viewpoint that does not match up with one or more overlapping viewpoints is determined 1502. First, the total viewpoint difference $\Delta f$ between a given viewpoint without estimation and the same viewpoint with estimation is computed 1506 by going through each viewpoint around object 1300. For examples, this viewpoint difference can also be referred to as the between the viewpoint and a projection of the viewpoint that matches the overlapping viewpoint.

Accordingly, points $(X_i, Y_i, Z_i)$ are transformed using this relative viewpoint to $(X'_i, Y'_i, Z'_i)$. The points should ideally land onto themselves, hence, these points are moved toward (1404, 1406) their original locations in the viewpoint before any estimation was made, by a weighted combination $(X''_i, Y''_i, Z''_i) = (1-\alpha)(X'_i, Y'_i, Z'_i) + \alpha(X_i, Y_i, Z_i)$. Thus, a transformation is determined that changes $(X'_i, Y''_i, Z''_i)$ to $(X'_i, Y'_i, Z'_i)$ and force this incremental change to be small by choosing a sufficiently low value of $\alpha$. This procedure is repeated for all viewpoints iteratively until, for example, feature 1308a converges with feature 1308b. Adjust the location of points of the 3D model by distributing the viewpoint difference 1506. At the end of this process, a point cloud for the entire object in a single reference frame has been generate, and the relative viewpoints of all camera viewpoints with respect this reference frame are known. The detected image features for all images along with their available 3D locations in this reference frame are also stored. The 3D locations of features are especially useful for matching a query image of 3D object to our database. The generated models using this process can be fine-tuned for object class specific algorithms to generate realistic rendering of the objects.

In addition to an enhanced visualization experience, 3D models of products provide a wealth of data that can be utilized in multiple ways. For example, mobile shopping apps that aim at matching products using camera-phone images and redirecting them to their websites to buy them. It is a known fact that having 3D models instead of just images increases matching accuracy and hence the user experience. Another potential use of 3D models is inserting photo-realistic renderings of products in an image or video which is otherwise impossible with just image data. Examples include adding a wrist watch to a customer's hand, inserting furniture inside a room, etc. This document describes methods and system for creating high quality 3D models for products which can power the aforementioned applications and many more. The starting point of the algorithm is a point cloud describing the coarse structure of the object along with the accompanying hi-resolution images of the object, and the output is texture mapped 3D models, that can be visualized from any arbitrary viewpoint. We use the data capture setup and coarse modeling algorithms from the earlier submission titled "Framework for Coarse 3D Modeling of online retail products".

Creating 3D models of objects can facilitate multiple applications in online retail—ranging from better visualization and interaction with the product the user intends to buy, inspecting details, inserting the product in a new virtual environment, and many more. Towards creating high quality visualizations that are pleasing to human eye, the first step is to create rough model that captures coarse structure of the object. Many retailers now-a-days also have mobile shopping apps that match the object that the user is looking at and redirect them to their website for purchase. It is known that even coarse 3D models can enhance the matching accuracy of such apps.

Figure 16:
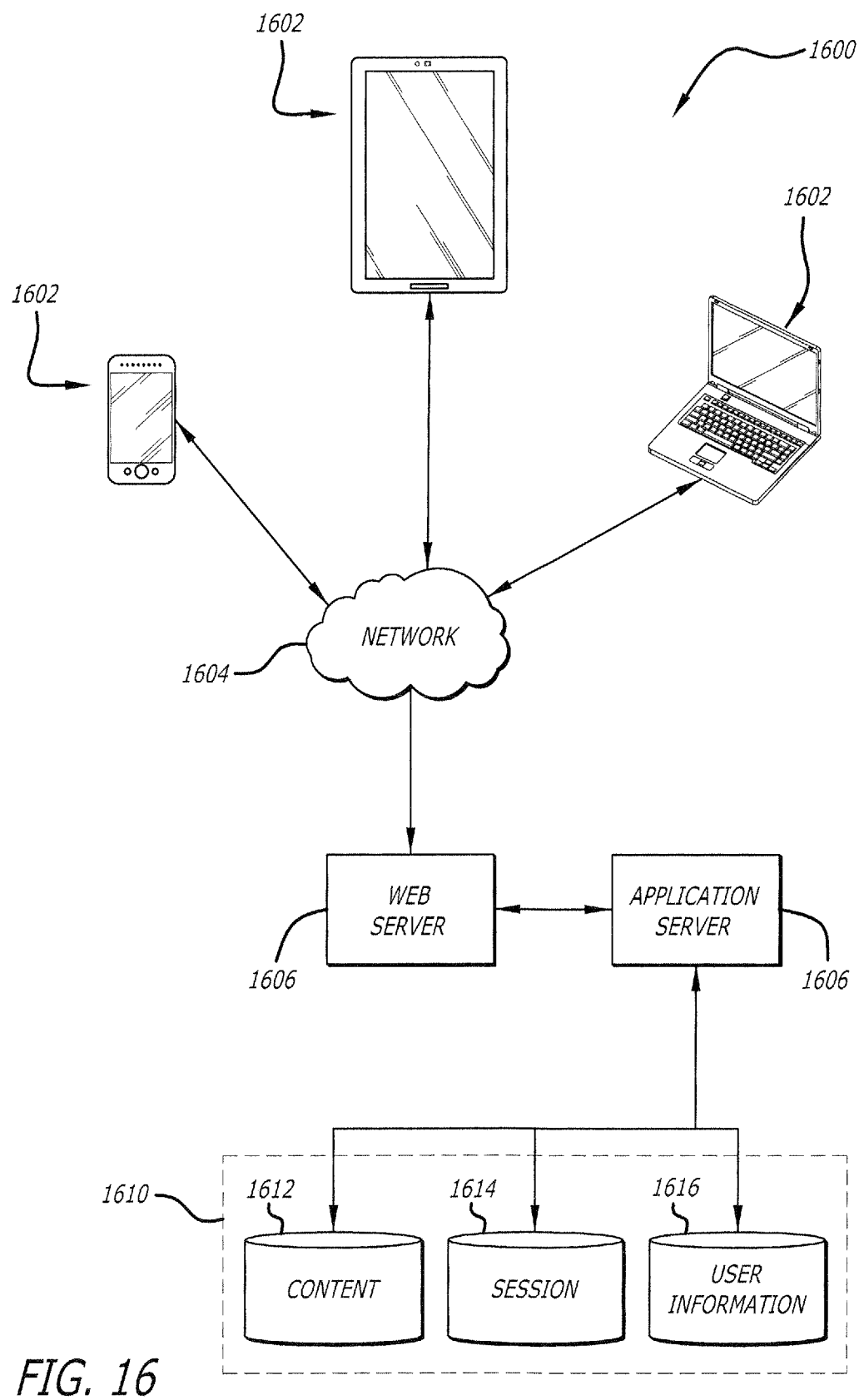
FIG. 16 illustrates an environment in which various embodiments can be implemented.

As discussed, different approaches can be implemented in various environments in accordance with the described embodiments. For example, FIG. 16 illustrates an example of an environment 1600 for implementing aspects in accordance with various embodiments. As will be appreciated, although a Web-based environment is used for purposes of explanation, different environments may be used, as appropriate, to implement various embodiments. The system includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1606 for receiving requests and serving content in response thereto, although for other networks, an alternative device serving a similar purpose could be used, as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1606 in the form of HTML, XML or another appropriate structured language in this example. The handling of all requests and responses, as well as the delivery of content between the client device 1602 and the application server 1608, can be handled by the Web server 1606. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing content (e.g., production data) 1612 and user information 1616, which can be used to serve content for the production side. The data store is also shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:
   capture, using a first camera, depth data associated with an object for each of a plurality of viewpoints;
   capture, using a second camera distinct from the first camera, first image data of the object for each of the plurality of viewpoints;
   perform a preregistered process to align two-dimensional (2D) coordinates of the first image data and three-dimensional (3D) coordinates of the depth data;
   capture, using a third camera placed rigidly at a fixed distance from the first camera, second image data of the object from each of the plurality of viewpoints, the second image data being a higher resolution than the first image data;

extract first features from the first image data for each of the plurality of viewpoints;

extract second features from the second image data for each of the plurality of viewpoints;

determine matching features between the first features and the second features for each of the plurality of viewpoints;

determine a first mapping between the first image data and the second image data for each of the plurality of viewpoints based on the matching features, the first mapping registering the 3D coordinates of the depth data to the second image data;

determine matching second features between the second image data of adjacent viewpoints of the plurality of viewpoints;

determine a second mapping between the second image data of adjacent viewpoints using a projective mapping algorithm and utilizing the matching second features and the first image data;

generate, using at least the depth data, a 3D point cloud for the object;

generate, using a mesh reconstruction algorithm, a triangular mesh of the object from the 3D point cloud; and generate a 3D model of the object by projecting, based at least in part on the 3D coordinates for the second features from the first mapping, the second image data onto the triangular mesh for each viewpoint of the plurality of viewpoints using the second mapping.

2. The non-transitory computer-readable storage medium of claim 1, wherein the instructions that, when executed by at least one processor, further cause the computing device to:
select a reference viewpoint;
determine a difference between the reference viewpoint and an estimated mapping for the reference viewpoint; and
adjust one or more viewpoints of the plurality of viewpoints by distributing the difference between the reference viewpoint and the estimated mapping of the reference viewpoint.

3. The non-transitory computer-readable storage medium of claim 1, wherein the instructions that, when executed by at least one processor, further cause the computing device to:
determine, for a set of points of the 3D point cloud, a normal direction by fitting one or more planes to the set of points;
estimate, for the one or more planes, one or more intercepts between planes;
refine the 3D point cloud by uniformly sampling points of the one or more planes;
estimate an error-in-fit between the 3D point cloud and the refined 3D point cloud by comparing at least a portion of the points of the refined 3D point cloud to corresponding points of the 3D point cloud; and
determine, in response to the error-in-fit being greater than a threshold, the object belongs to a cuboid shape class.

4. The non-transitory computer-readable storage medium of claim 1, wherein the instructions that, when executed by at least one processor, further cause the computing device to:
estimate, for each height of the 3D point cloud, a circle, the estimated circle providing a center and a radius;
refine the 3D point cloud by uniformly sampling points of the 3D point cloud, the center of each circle for each height corresponding to a z-axis of the object;
estimate an error-in-fit between the 3D point cloud and the refined 3D point cloud by comparing at least a portion of the points of the refined 3D point cloud to corresponding points of the 3D point cloud; and
determine, in response to the error-in-fit being greater than a threshold, the object belongs to a bottle shape class.

5. A computer-implemented method, comprising:
capturing, using a first camera, depth information associated with an object, the depth information indicating a distance between the object and the first camera;
capturing, using a second camera distinct from the first camera, a first image that includes a first representation of the object, pixels of the first image associated with two-dimensional (2D) coordinates;
determining three-dimensional (3D) coordinates for the pixels of the first image based at least in part on the 2D coordinates and the depth information;
aligning the 3D coordinates associated with the depth information with the 2D coordinates of the first image;
capturing, using a third camera placed rigidly at a fixed distance from the first camera, a second image that includes a second representation of the object, the third camera being a higher resolution camera than the second camera;
determining matching features between the first image and the second image;
determining a first mapping between the first image and the second image based on the matching features;
determining 3D coordinates for the second image based at least in part on the depth information and the first mapping;
determining matching second features between the second image at a first view angle and another second image at a second view angle;
determining a second mapping between the second image at the first view angle and the another second image at the second view angle using a projective mapping algorithm and utilizing the matching second features and the first image captured using the second camera; and
generating a 3D model of the object based at least in part on the second image and the 3D coordinates of the second image at a plurality of view angles, and the second mapping.

6. The computer-implemented method of claim 5, further comprising:
capturing, using the first camera, second depth information of the object;
capturing, using the second camera, a third image of the object;
capturing, using the third camera, a fourth image of the object;
determining matching third features between the third image and the fourth image; and
determining second 3D coordinates for the fourth image based at least in part on the matching third features between the third image and the fourth image.

7. The computer-implemented method of claim 6, wherein;
determining matching fourth features between the second image and the fourth image;
determining a third mapping between the second image and the fourth image based on the matching fourth features;
generating, using the depth information, a 3D point cloud for the object; and generating the 3D model by projecting, based at least in part on the 3D coordinates for the second image and the third mapping, the second image and the fourth image onto the 3D point cloud.

8. The computer-implemented method of claim 7, further comprising:
   determining a difference between a viewpoint corresponding to the fourth image and the third mapping of the fourth image to the second image; and
   adjusting at least one of one or more features of the second images of each viewpoint or one or more viewpoints of a plurality of viewpoints by distributing the difference between the viewpoint corresponding to the fourth image and the third mapping of the fourth image to the second image.

9. The computer-implemented method of claim 7, further comprising:
   estimating, for each height of the 3D point cloud, a circle, the estimated circle providing a center and a radius;
   refining the 3D point cloud by uniformly sampling points of the 3D point cloud, the center of each circle for each height corresponding to a z-axis of the object;
   estimating an error-in-fit between the 3D point cloud and the refined 3D point cloud by comparing at least a portion of the points of the refined 3D point cloud to corresponding points of the 3D point cloud; and
   determining, in response to the error-in-fit being greater than a threshold, the object belongs to a bottle shape class.

10. The computer-implemented method of claim 7, further comprising:
    determining, for a set of points of the 3D point cloud, a normal direction by fitting one or more planes to the set of points;
    estimating, for the one or more planes, one or more intercepts between planes;
    refining the 3D point cloud by uniformly sampling points of the one or more planes;
    estimating an error-in-fit between the 3D point cloud and the refined 3D point cloud by comparing at least a portion of the points of the refined 3D point cloud to corresponding points of the 3D point cloud; and
    determining, in response to the error-in-fit being greater than a threshold, the object belongs to a cuboid shape class.

11. The computer-implemented method of claim 5, wherein the matching features are extracted using a feature extraction algorithm, wherein the feature extraction is at least one of Scale-invariant feature transform (SIFT), Speeded Up Robust Features (SURF), or Accumulated Signed Gradient (ASG).

12. The computer-implemented method of claim 7, wherein the third mapping is at least one of projective mapping or Euclidean mapping, and wherein the at least one of projective mapping or Euclidean mapping is performed using Random Sampling Consensus (RANSAC).

13. A computing system, comprising:
    a processor;
    an image sensor;
    a first camera distinct from the image sensor;
    a second camera placed rigidly at a fixed distance from the image sensor having overlapping fields of view that are maintained throughout a plurality of elevations and rotation angles of the second camera; and
    memory including instructions that, when executed by the processor, cause the computing system to:
       capture, using a first camera, depth information associated with an object, the depth information indicating a distance between the object and the first camera;
       capture, using a second camera distinct from the first camera, a first image that includes a first representation of the object, pixels of the first image associated with two-dimensional (2D) coordinates;
       determine three-dimensional (3D) coordinates for the pixels of the first image based at least in part on the 2D coordinates and the depth information;
       align the 3D coordinates associated with the depth information with the 2D coordinates of the first image;
       capture, using a third camera placed rigidly at a fixed distance from the first camera, a second image that includes a second representation of the object, the third camera being a higher resolution camera than the second camera;
       determine matching features between the first image and the second image;
       determine a first mapping between the first image and the second image based on the matching features;
       determine 3D coordinates for the second image based at least in part on the depth information and the first mapping;
       determine matching second features between the second image at a first view angle and another second image at a second view angle;
       determine a second mapping between the second image at the first view angle and the another second image at the second view angle using a projective mapping algorithm and utilizing the matching second features and the first image; and
       generate a 3D model of the object based at least in part on the second image and the 3D coordinates of the second image at a plurality of view angles, and the second mapping.

14. The computing system of claim 13, wherein the instructions, when executed by the processor, further enable the computing system to:
    capture, using the first camera, second depth information of the object;
    capture, using the second camera, a third image of the object;
    capture, using the third camera, a fourth image of the object;
    determine matching third features between the third image and the fourth image; and
    determine second 3D coordinates for the fourth image based at least in part on the matching third features between the third image and the fourth image.

15. The computing system of claim 14, wherein the instructions, when executed by the processor, further enable the computing system to:
    determine matching fourth features between the second image and the fourth image;
    determine a third mapping between the second image and the fourth image based on the matching fourth features;
    generate, using the depth information, a 3D point cloud for the object; and
    generate the 3D model by projecting, based at least in part on the 3D coordinates for the second image and the third mapping, the second image and the fourth image onto the 3D point cloud.

16. The computing system of claim 15, wherein the instructions, when executed by the processor, further enable the computing system to:
- determine a difference between a viewpoint corresponding to the fourth image and the third mapping of the fourth image to the second image; and
- adjust at least one of one or more features of the images of each viewpoint or one or more viewpoints of a plurality of viewpoints by distributing the difference between the viewpoint corresponding to the fourth image and the third mapping of the fourth image to the second image.

17. The computing system of claim 15, wherein the instructions, when executed by the processor, further enable the computing system to:
- determine, for a set of points of the 3D point cloud, a normal direction by fitting one or more planes to the set of points;
- estimate, for the one or more planes, one or more intercepts between planes;
- refine the 3D point cloud by uniformly sampling points of the one or more planes;
- estimate an error-in-fit between the 3D point cloud and the refined 3D point cloud by comparing at least a portion of the points of the refined 3D point cloud to corresponding points of the 3D point cloud; and
- determine, in response to the error-in-fit being greater than a threshold, the object belongs to a cuboid shape class.

18. The computing system of claim 15, wherein the instructions, when executed by the processor, further enable the computing system to:
- estimate, for each height of the 3D point cloud, a circle, the estimated circle providing a center and a radius;
- refine the 3D point cloud by uniformly sampling points of the 3D point cloud, the center of each circle for each height corresponding to a z-axis of the object;
- estimate an error-in-fit between the 3D point cloud and the refined 3D point cloud by comparing at least a portion of the points of the refined 3D point cloud to corresponding points of the 3D point cloud; and
- determine, in response to the error-in-fit being greater than a threshold, the object belongs to a bottle shape class.

19. The computing system of claim 13, wherein the matching features are extracted using a feature extraction algorithm, wherein the feature extraction is at least one of Scale-invariant feature transform (SIFT), Speeded Up Robust Features (SURF), or Accumulated Signed Gradient (ASG).

20. The computing system of claim 15, wherein the third mapping is at least one of projective mapping or Euclidean mapping, and wherein the at least one of projective mapping or Euclidean mapping is performed using Random Sampling Consensus (RANSAC).

* * * * *